(12) United States Patent
Ishii

(10) Patent No.: US 10,803,899 B2
(45) Date of Patent: Oct. 13, 2020

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Koji Ishii, Fujisawa Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/557,035

(22) Filed: Aug. 30, 2019

(65) Prior Publication Data

US 2020/0294544 A1 Sep. 17, 2020

(30) Foreign Application Priority Data

Mar. 13, 2019 (JP) ................................. 2019-045965

(51) Int. Cl.
*G11B 5/09* (2006.01)
*G11B 19/04* (2006.01)
*G11B 5/55* (2006.01)
*G11B 5/49* (2006.01)

(52) U.S. Cl.
CPC .............. *G11B 19/048* (2013.01); *G11B 5/09* (2013.01); *G11B 5/4984* (2013.01); *G11B 5/556* (2013.01)

(58) Field of Classification Search
None
See application file for complete search history.

(56) References Cited

U.S. PATENT DOCUMENTS

| 4,627,039 | A | * | 12/1986 | Meyer | G11B 7/085 |
| | | | | | 369/44.28 |
| 5,134,602 | A | * | 7/1992 | Baca | G11B 7/0037 |
| | | | | | 369/44.27 |
| 5,402,402 | A | * | 3/1995 | Kagami | G11B 7/08517 |
| | | | | | 369/30.15 |
| 5,949,608 | A | * | 9/1999 | Hunter | G11B 5/5534 |
| | | | | | 360/78.06 |
| 6,646,825 | B1 | * | 11/2003 | Kaneda | G11B 5/012 |
| | | | | | 360/63 |
| 6,680,810 | B2 | | 1/2004 | Shiraishi et al. | |
| 6,707,633 | B2 | | 3/2004 | Okuyama et al. | |

(Continued)

*Primary Examiner* — Peter Vincent Agustin
(74) *Attorney, Agent, or Firm* — Kim & Stewart LLP

(57) ABSTRACT

A magnetic disk device includes a control circuit, and a disk unit including a plurality of magnetic disks, a plurality of magnetic heads configured to read or write data from or to the magnetic disks, a first actuator configured to move the magnetic heads, a plurality of second actuators each configured to move the corresponding magnetic head, and a switch circuit configured to connect the control circuit and one of the second actuators. The control circuit is configured to transmit to the disk unit an instruction in which one of the magnetic heads is specified, control one of the second actuators corresponding to the specified magnetic head to move the magnetic head via the switch circuit, and based on a signal from the one of the second actuators, determine whether an error occurs in the one of the second actuators.

20 Claims, 7 Drawing Sheets

(56) References Cited

U.S. PATENT DOCUMENTS

| | | | |
|---|---|---|---|
| 6,831,807 B2 | 12/2004 | Koso et al. | |
| 2001/0015866 A1* | 8/2001 | Nakagawa | G11B 5/5552 360/62 |
| 2002/0012193 A1* | 1/2002 | Kobayashi | G11B 5/5552 360/78.05 |
| 2002/0196577 A1* | 12/2002 | Harmer | G11B 5/54 360/78.06 |

* cited by examiner

MAGNETIC DISK DEVICE

CROSS-REFERENCE TO RELATED APPLICATION(S)

This application is based upon and claims the benefit of priority from Japanese Patent Application No. 2019-045965, filed Mar. 13, 2019, the entire contents of which are incorporated herein by reference.

FIELD

Embodiments described herein relate generally to a magnetic disk device.

BACKGROUND

A magnetic disk device includes a magnetic head slider having at least one thin film magnetic head element, an actuator which is fixed to the magnetic head slider and performs precise-positioning of the thin film magnetic head element, an IC chip including at least a first circuit for controlling a thin film magnetic head element and a second circuit for driving the actuator, and a suspension for fixing and supporting the actuator and IC chip. The suspension is designed for the magnetic disk device to achieve higher density recording and to reduce the number of wires passing through the suspension.

The magnetic disk device is also equipped with a microactuator. The microactuator is an actuator which has a small driving unit using a piezo element and has a high operation response speed. By providing such a microactuator in addition to the regular actuator which operates a head unit for coarse positioning, the positioning accuracy of the magnetic head on a predetermined track is improved.

When the magnetic disk device has a plurality of actuators, a plurality of microactuators is provided according to the number of actuators. Here, the plurality of microactuators is all operated by a specific voltage.

In general, a disk unit called a head disk assembly incorporating a magnetic disk, an actuator, microactuators, and the like is manufactured in a clean room or the like and is shielded from external dust even after completion. Therefore, access to a control printed circuit board which controls the disk unit can only be made via a connector, and due to restriction of pins of the connector, it is difficult to separately control the microactuators via the control printed circuit board to check whether the microactuators operate correctly. Even though all the microactuators are connected in parallel and electrical characteristics of the microactuators can be measured before installing the microactuators in the head disk assembly, it is still difficult to determine exactly which microactuator has failure.

Therefore, to determine which microactuator has failure, the control printed circuit board needs to be attached after assembling the head disk assembly, and the magnetic head needs to be moved to read a predetermined mark prerecorded on a track of the magnetic disk.

As described above, it cannot be detected whether the microactuators have failure until the head disk assembly is assembled. Thus, when the failure is detected, it is necessary to remove the control printed circuit board, return the head disk assembly to a clean room to disassemble the same, and replace the magnetic head from the head disk assembly.

DETAILED DESCRIPTION

Figure 1:
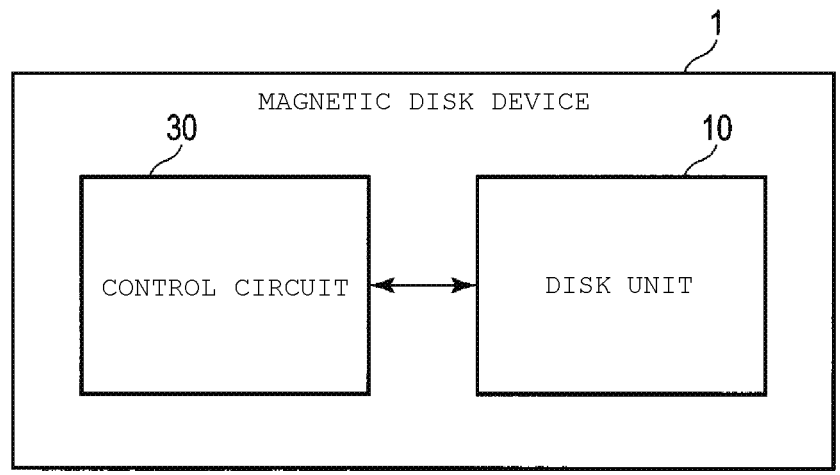
FIG. 1 is a view illustrating a configuration of a magnetic disk device according to a first embodiment.

Embodiments provide a magnetic disk device capable of facilitating inspection of a microactuator.

In general, according to one embodiment, a magnetic disk device includes a control circuit, and a disk unit including a plurality of magnetic disks, a plurality of magnetic heads configured to read or write data from or to the magnetic disks, a first actuator configured to move the magnetic heads, a plurality of second actuators each configured to move the corresponding magnetic head, and a switch circuit configured to connect the control circuit and one of the second actuators. The control circuit is configured to transmit to the disk unit an instruction in which one of the magnetic heads is specified, control one of the second actuators corresponding to the specified magnetic head to move the magnetic head via the switch circuit, and based on a signal from the one of the second actuators, determine whether an error occurs in the one of the second actuators.

Hereinafter, embodiments will be described with reference to the drawings. The disclosure is merely an example and embodiments of the present disclosure are not limited by the contents described in the following embodiments. Variations that can be easily conceived by those skilled in the art are automatically included in the scope of the disclosure. In order to make the description clearer, in the drawings, the size, shape, and the like of each portion may be schematically represented by being changed with respect to the actual embodiment. In plural drawings, corresponding elements may be denoted by the same reference numerals and detailed descriptions thereof may be omitted.

First Embodiment

FIG. 1 is a view illustrating a configuration of a magnetic disk device according to the first embodiment. The magnetic disk device 1 includes a disk unit 10 and a control circuit 30. The control circuit 30 is a controller or a control circuit electrically connected to the disk unit 10 and controls the operation of the disk unit 10. The disk unit 10 is called, for example, a head disk assembly.

Figure 2:
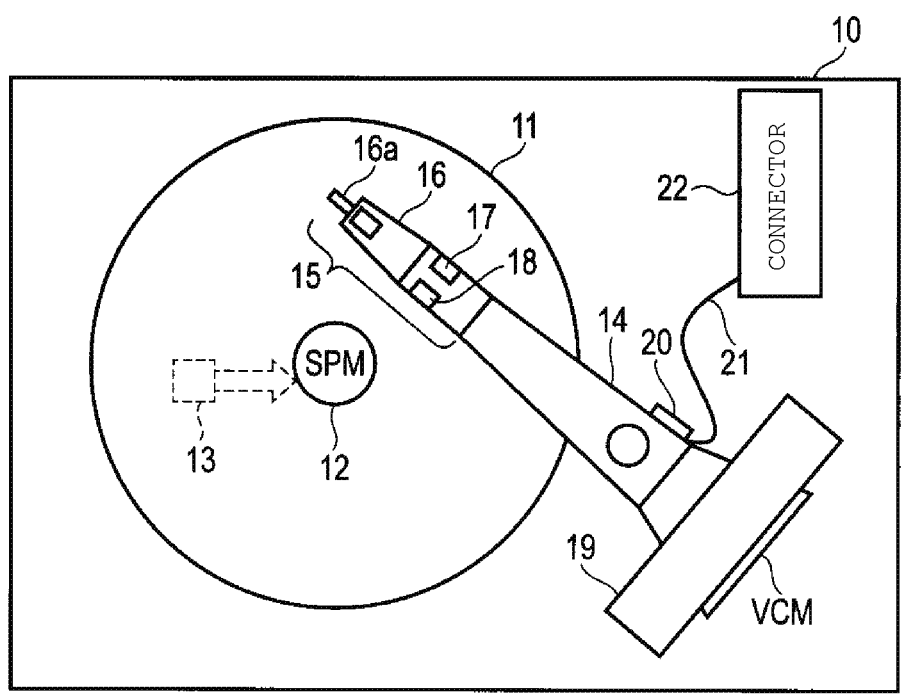
FIG. 2 is a view illustrating a configuration of a disk unit according to the first embodiment.

FIG. 2 is a view illustrating a configuration of the disk unit 10 according to the first embodiment.

As illustrated in FIG. 2, the disk unit 10 includes a magnetic disk 11, a spindle motor (SPM) 12, an SPM connector 13, an actuator 14, a suspension 15, a magnetic circuit 19, a head amplifier IC 20, a flexible printed wiring board (FPC) 21, and a connector 22. In addition, the suspension 15 includes a slider 16, a magnetic head 16a, and microactuators 17 and 18. The actuator 14, the suspension 15 including the slider 16, the magnetic head 16a and the microactuators 17 and 18 make up a magnetic head unit.

The magnetic disk 11 includes, for example, a substrate formed in a disk shape and made of non-magnetic material. On each surface of the substrate, a soft magnetic layer made of a material exhibiting soft magnetic properties, a magnetic recording layer having magnetic anisotropy in a direction perpendicular to a disk surface on an upper layer portion of the soft magnetic layer, and a protective film layer on an upper layer portion of the magnetic recording layer are stacked in the described order.

The magnetic disk 11 is fixed to the SPM 12 and rotated at a predetermined speed by the SPM 12. In the first embodiment, a plurality of magnetic disks 11 is provided in the SPM 12. In the first embodiment, each of the plurality of magnetic disks 11 has two magnetic recording surfaces. According to the number of magnetic disks 11, the suspensions 15 each including the magnetic head 16a, the slider 16, and the microactuators 17 and 18 are provided in the magnetic head unit. That is, when two magnetic disks 11 are provided in the magnetic disk device 1 according to the first embodiment, there are four magnetic recording surfaces and four suspensions 15 each including the magnetic head 16a, the slider 16, and the microactuators 17 and 18 are provided. The number of magnetic disks 11 is not limited to four and may be one or three or more. The SPM 12 is driven by a driving current (or driving voltage) supplied from a servo combo (SVC) 36 described below. In the magnetic disk 11, a data pattern is recorded and read by the magnetic head 16a. The SPM 12 is connected to the SVC 36 via the SPM connector 13.

The actuator 14 is configured to pivot. By pivoting the actuator 14 by a voice coil motor (VCM), the magnetic head 16a is moved and positioned on a desired track of the magnetic disk 11. The VCM is driven by a driving current (or driving voltage) supplied from the servo combo (SVC) 36.

The suspension 15 is a frame which supports the magnetic head 16a. The suspension 15 includes the slider 16 at a tip end side thereof and microactuators 17 and 18 on a base side thereof. The slider 16 includes the magnetic head 16a, and the magnetic head 16a includes a read head for reading data from the magnetic disk 11 and a write head for writing data to the magnetic disk 11.

The microactuators 17 and 18 adjust the position of the magnetic head 16a positioned by the actuator 14. Accordingly, the positioning accuracy of the magnetic head 16a can be improved. The positions at which the microactuators 17 and 18 are provided are not limited to the positions illustrated in FIG. 2 and may be provided, for example, in adjacent to the magnetic head 16a. In the first embodiment, the microactuators 17 and 18 use piezo elements and deform the piezo elements by applying a voltage to adjust the position of the magnetic head 16a.

The head amplifier IC 20 is connected to a system on chip (SOC) 31 described below by the FPC 21 and the connector 22. The head amplifier IC 20 supplies a write signal corresponding to the write data supplied from the SOC 31 to the write head of the magnetic head 16a. The head amplifier IC 20 amplifies the read signal output from the read head of the magnetic head 16a and transmits the amplified read signal to the SOC 31.

The FPC 21 is a wiring board provided between the head amplifier IC 20 and the connector 22. The FPC 21 is connected to the SOC 31 via the connector 22. The FPC 21 includes a plurality of signal lines for transmitting signals from the SOC 31 to the head amplifier IC 20 and for transmitting signals from the head amplifier IC 20 to the SOC 31.

Figure 3:
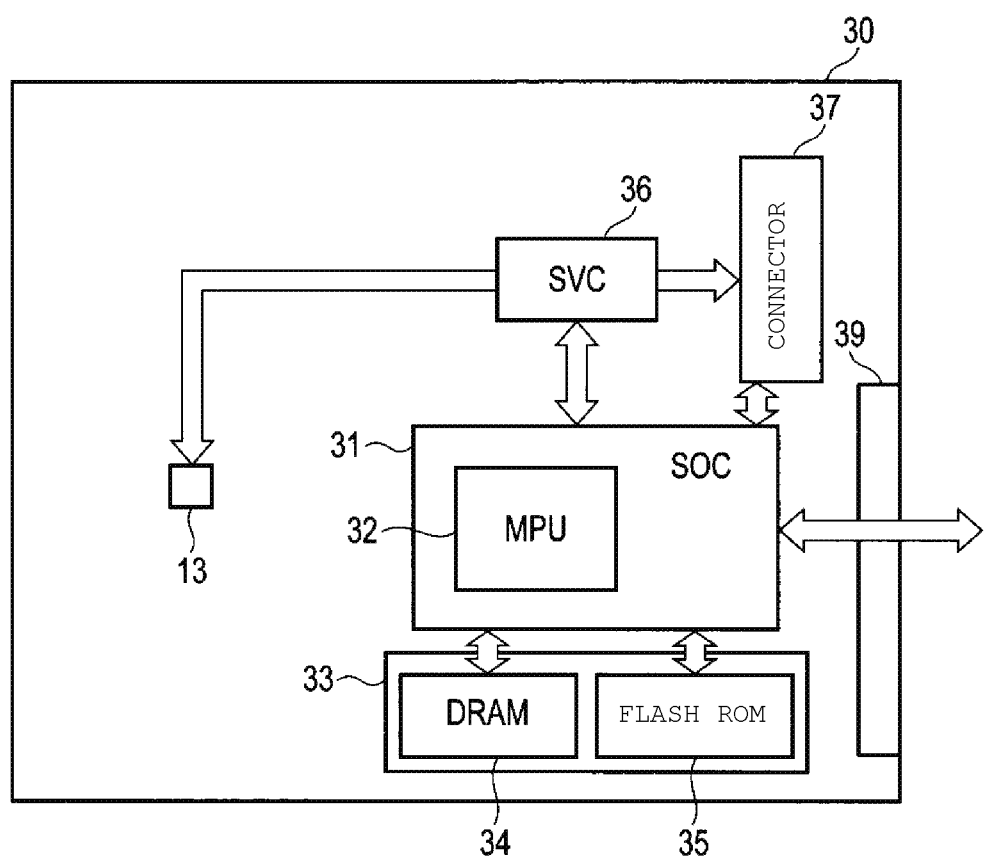
FIG. 3 is a view illustrating a configuration of a control circuit according to the first embodiment.

FIG. 3 is a view illustrating a configuration of the control circuit 30 according to the first embodiment.

As illustrated in FIG. 3, the control circuit 30 includes the SOC 31, a memory 33, the servo combo (SVC) 36, the connector 37, and the SPM connector 13. The SOC 31 includes an MPU 32, and the memory 33 includes a DRAM 34 and a flash ROM 35.

The SOC 31 includes the MPU 32, an R/W channel (not illustrated), and a hard disk controller (not illustrated), which may be integrated into one chip. The R/W channel is a signal processing circuit which processes a signal associated with read/write processes. The hard disk controller controls writing of data to the magnetic disk 11 and reading of data from the magnetic disk 11 through the magnetic head 16a, the head amplifier IC 20, the R/W channel, and the MPU 32.

The MPU 32 is a main controller of the magnetic disk device 1 and executes servo control necessary for control of the read/write operation and positioning and adjustment of the magnetic head 16a. The memory 33 includes the RAM 34 which is a volatile memory and the flash ROM 35 which is a non-volatile memory. The memory 33 stores programs and parameters necessary for the processing of the MPU 32.

The SVC 36 controls the rotation of the SPM 12 and the VCM and controls the actuator 14 and the microactuators 17 and 18 based on the instructions of the MPU 32 to position the magnetic head 16a in a predetermined track. The connector 37 is connected to the connector 22. The SPM connector 13 is connected to the SPM 12 and transmits a signal transmitted from the SVC 36 to the SPM 12 to rotate the SPM 12.

Figure 4:
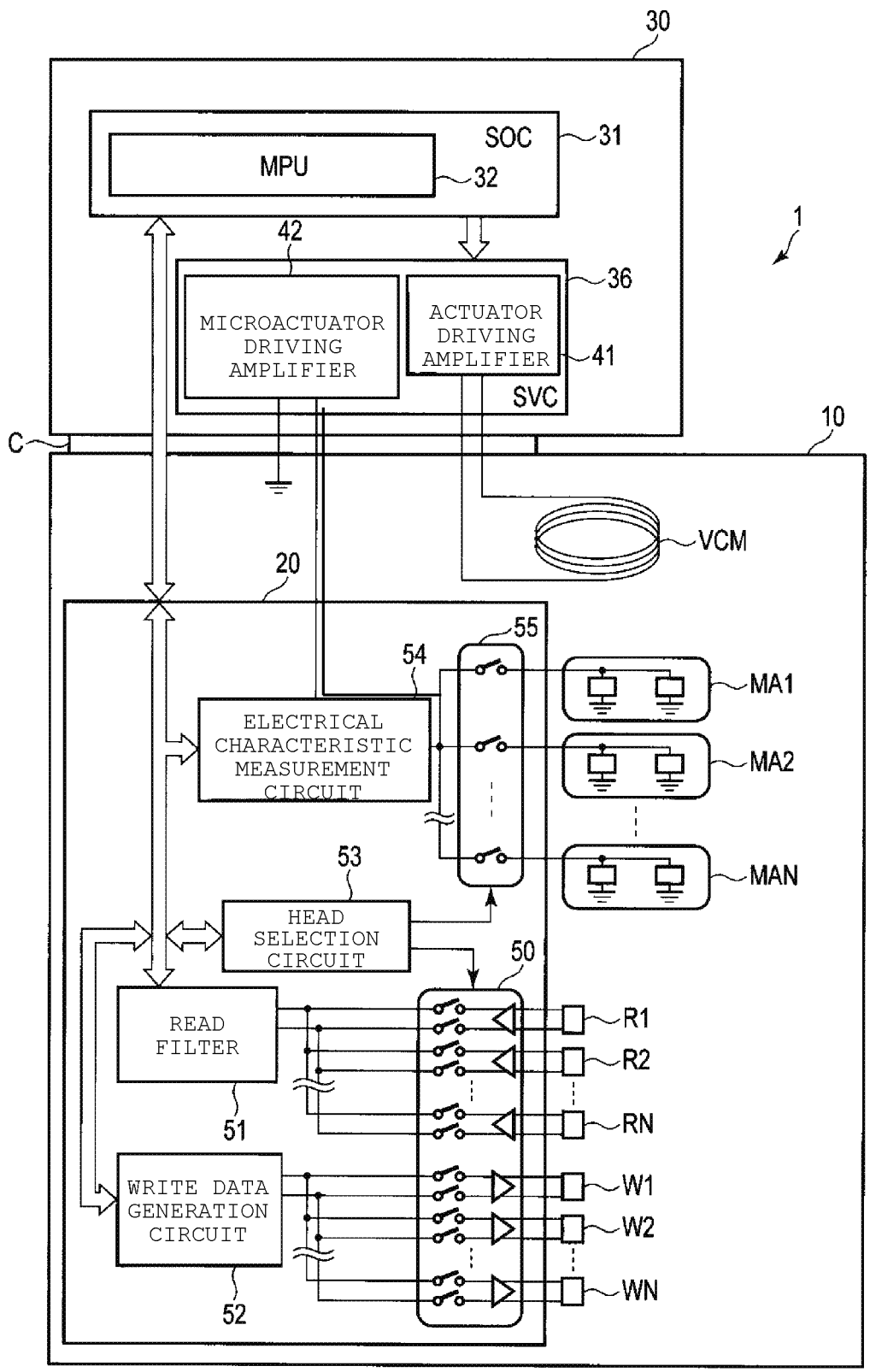
FIG. 4 is a view illustrating a configuration of the control circuit and the disk unit according to the first embodiment.

FIG. 4 is a view illustrating a configuration of the control circuit 30 and the disk unit 10 according to the first embodiment. In FIG. 4, N (N is a natural number) pieces of the suspensions 15 are provided in the magnetic disk device 1. Further, the description is omitted except for the configuration for operating the actuators and the microactuators.

As illustrated in FIG. 4, the control circuit 30 and the disk unit 10 are connected by a connector C, which corresponds to the connectors 22 and 37 described above. The disk unit 10 includes a VCM, the head amplifier IC 20, microactuators MA1, MA2, . . . , MAN, read heads R1, R2, . . . , RN, and write heads W1, W2, . . . , WN. The head amplifier IC 20 includes a first switching circuit 50, a read filter 51, a write data generation circuit 52, a head selection circuit 53, an electrical characteristic measurement circuit 54, and a second switching circuit 55. The SVC 36 in the control circuit 30 includes an actuator driving amplifier 41 and a microactuator driving amplifier 42.

The actuator driving amplifier 41 controls the operation of the VCM. Therefore, the actuator 14 rotates. In addition, the microactuator driving amplifier 42 is connected to the microactuators MA1, MA2, . . . , MAN (N is a natural number) via the second switching circuit 55. Further, each of the microactuators MA1, MA2, . . . , MAN includes the microactuators 17 and 18 described above. The second switching circuit 55 includes a plurality of switches so that each of the microactuators MA1, MA2, . . . , MAN can be turned on or off. When the magnetic disk device 1 reads or writes data from or to the magnetic disk 11, one of the microactuators MA1, MA2, . . . , MAN is turned on based on the instruction of the head selection circuit 53, and the position of the magnetic head 16a is adjusted by the microactuator that has been turned on.

The first switching circuit 50 includes a plurality of switches so that each of the read heads R1, R2, . . . , RN and each of the write heads W1, W2, . . . , WN can be turned on or off. The read head R1 and the write head W1 form one set, the read head R2 and the write head W2 form another set, and so on. Such a manner, plural sets each including a read head and a write head are provided in one suspension 15. When the magnetic disk device 1 reads or writes data from or to the magnetic disk 11, based on the instructions of the head selection circuit 53, one of the sets including the read heads and write heads is turned on, and the data is read from the magnetic disk 11 or the data is written to the magnetic disk 11.

The read filter 51 filters a predetermined frequency of the read signal read from one of the read heads R1, R2, . . . , RN. Therefore, noise of the read signal is removed. The read signal which passes through the read filter 51 is output to the SOC 31. The write data generation circuit generates write data based on the write command received from the SOC 31. The generated write data is written by one of the write heads W1, W2, . . . , WN.

When the magnetic disk device 1 reads or writes data from or to the magnetic disk 11, the head selection circuit 53 transmits an instruction to the first switching circuit 50 to turn on the switch corresponding to the read head and the write head of the magnetic head unit instructed by the MPU 32, and transmits an instruction to the second switching circuit 55 to turn on the microactuator provided in the suspension 15 having the read head and the write head. Thus, the read head and the write head for performing reading/writing are operable and the microactuator provided in the magnetic head unit having the read head and the write head is operable.

The second switching circuit 55 is configured to turn on or off the microactuators MA1, MA2, . . . , MAN based on the instruction from the head selection circuit 53. The electrical characteristic measurement circuit 54 measures electrical characteristics, e.g., resistance values of the microactuators MA1, MA2, . . . , MAN in the first embodiment. To measure the resistance values, the electrical characteristic measurement circuit 54 may be connected the ground. Then, the measurement result is acquired by the MPU 32. For example, when the microactuator MA1 is ON and the other microactuators are OFF, the MPU 32 acquires the voltage value of the microactuator MA1.

Figure 5:
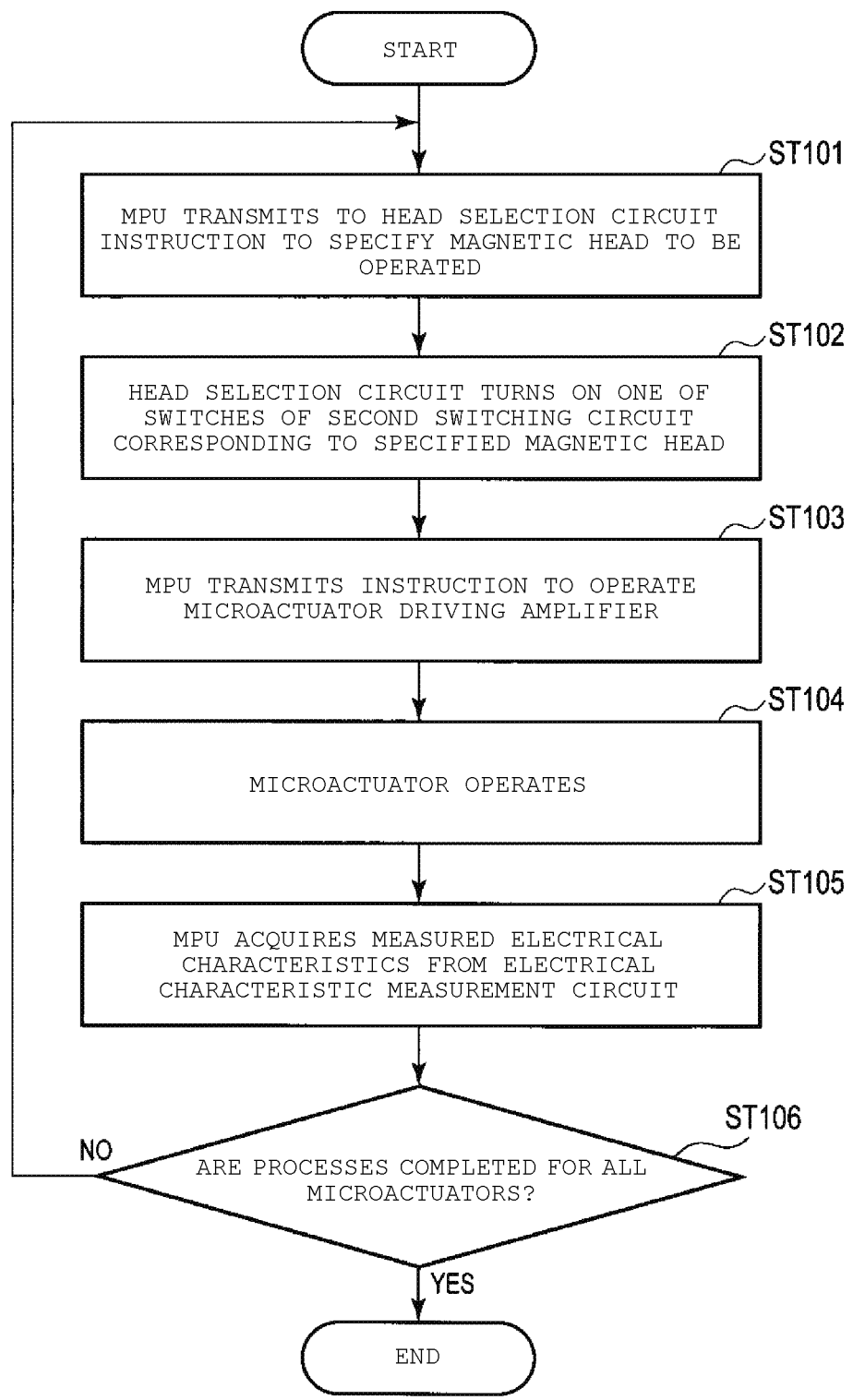
FIG. 5 is a flowchart illustrating an inspection process of the microactuator according to the first embodiment.

Next, a process of inspecting the microactuators MA1, MA2, . . . , MAN of the magnetic disk device 1 will be described. FIG. 5 is a flow chart illustrating an inspection process of the microactuator in the first embodiment. This process is implemented by a program stored in the flash ROM and executed, for example, before the disk unit 10 is assembled into almost a product.

As illustrated in FIG. 5, the MPU 32 transmits, to the head selection circuit 53, an instruction to specify one magnetic head 16a (i.e., a read head and a write head) to be operated (ST101). Next, the head selection circuit 53 turns on one of the switches of the second switching circuit 55 corresponding to the specified magnetic head 16a (ST102).

Next, the MPU 32 transmits an instruction to operate the microactuator driving amplifier 42 to the SVC 36 (ST103). By operating the microactuator driving amplifier 42, in the second switching circuit 55, the microactuator of which the switch is turned on operates (ST104). At this time, the MPU 32 acquires the measured electrical characteristics of the electrical characteristic measurement circuit 54 (ST105). That is, in the first embodiment, the MPU 32 acquires the resistance value of the microactuator in operation.

Next, the MPU 32 determines whether or not the processes are completed for all microactuators MA1, MA2, . . . , MAN (ST106). When it is determined that the processes are not completed (ST106: NO), the process returns to the step ST101 and executes the processes of the steps ST101 to ST105 for the other microactuators. Further, when it is determined that the processes are completed (ST106: YES), the MPU 32 finishes the processes. By executing such processes as described above, the MPU 32 can sequentially acquire the electrical characteristics (e.g., resistance values) of all the microactuators MA1, MA2, . . . , MAN in the second switching circuit 55. Then, the MPU 32 can determine whether or not any abnormality occurs in any of the microactuators MA1, MA2, . . . , MAN by comparing the electrical characteristics acquired as described above with a preset threshold value.

According to the magnetic disk device 1 described above, one microactuator can be selectively operated from the plurality of microactuators MA1, MA2, . . . , MAN. Therefore, without assembling the plurality of microactuators MA1, MA2, . . . , MAN into the disk unit 10 and attaching the FPC 21 to the disk unit 10, and then, making the magnetic head 16a read a pre-recorded mark on a track of the magnetic disk 11, it is possible to determine whether or not a failure occurs in the microactuators MA1, MA2, . . . , MAN. Therefore, an inspection of the microactuators MA1, MA2, . . . , MAN can be easily performed. As a result, it is possible to check whether a failure occurs in the microactuators MA1, MA2, . . . , MAN even before assembling the magnetic disk device into almost a product. Thus, even when an abnormality is found in a microactuator, it is possible to save time and labor for removing the FPC 21, returning the disk unit to a clean room to disassemble the disk unit 10, and replacing the magnetic head unit or the like from the disk unit 10.

Moreover, the microactuators MA1, MA2, . . . , MAN use piezo elements. Piezo elements have the property of depolarizing by environmental stress such as the amount used and temperature. If the configuration is made to operate all microactuators MA1, MA2, . . . , MAN when reading or writing is performed on the magnetic disk 11, operating all microactuators MA1, MA2, . . . , MAN means to operate even other microactuators that do not need to be operated because there is only one magnetic head 16a that performs reading or writing. In this case, the depolarizing of the microactuators MA1, MA2, . . . , MAN becomes faster. On the other hand, according to the magnetic disk device 1 of the first embodiment, one microactuator can be selectively operated among the plurality of microactuators MA1, MA2, . . . , MAN. As a result, the lifespan of the plurality of microactuators MA1, MA2, . . . , MAN is extended, and further, the lifespan of the magnetic disk device 1 can be extended.

Second Embodiment

A second embodiment is different from the first embodiment in that the microactuator driving amplifier 42 is provided in the disk unit 10. Only the difference will be described below. The same components as those in the first embodiment are denoted by the same reference signs and detailed descriptions thereof will be omitted.

Figure 6:
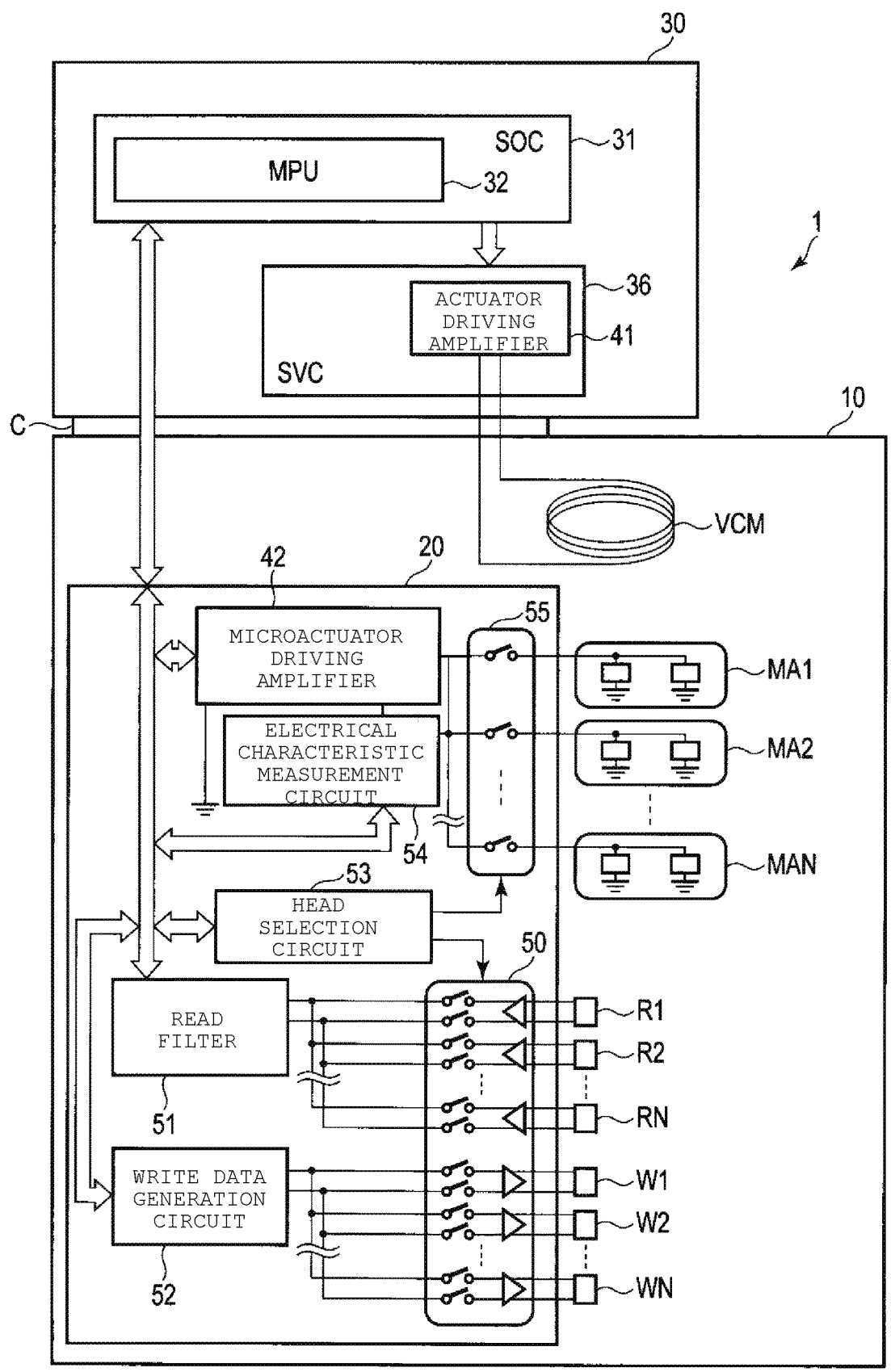
FIG. 6 is a view illustrating a configuration of a control circuit and a disk unit according to a second embodiment.

FIG. 6 is a view illustrating a configuration of the control circuit 30 and the disk unit 10 in the second embodiment. The description is omitted except for the configuration for operating the actuator and the microactuator.

As illustrated in FIG. 6, the microactuator driving amplifier 42 is provided in the head amplifier IC 20. The microactuator driving amplifier 42 is driven by receiving an instruction from the MPU 32 in the same manner as the first embodiment. Further, the present embodiment describes a configuration in which the head amplifier IC 20 is provided with the microactuator driving amplifier 42, but is not limited thereto. The location where the microactuator driving amplifier 42 is disposed may be any locations in the disk unit 10. Even when the magnetic disk device 1 is configured as described above, the same effect as that of the first embodiment can be obtained.

Third Embodiment

A third embodiment is different from the second embodiment in that the magnetic disk device has a configuration in which two disk units are provided (e.g., a configuration called a dual actuator). Only the difference will be described below. The same components as those of the second embodiment are denoted by the same reference signs and detailed descriptions thereof will be omitted.

Figure 7:
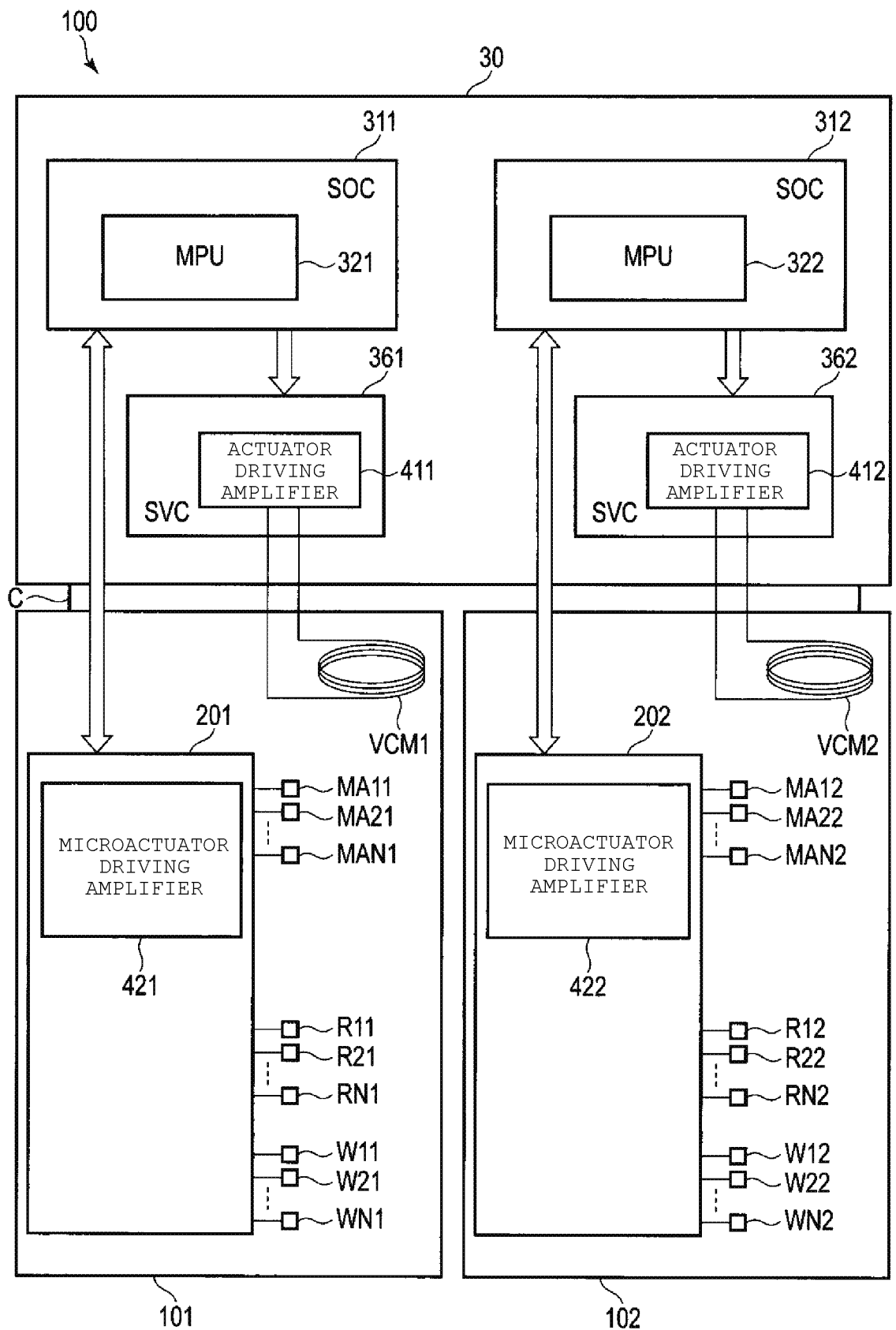
FIG. 7 is a view illustrating a configuration of a control circuit and a disk unit according to a third embodiment.

FIG. 7 is a view illustrating an example of configuration of a control circuit 30 and disk units 101 and 102 according to the third embodiment. The description is omitted except for the configuration for operating the actuator and the microactuator.

As described in FIG. 7, a magnetic disk device 100 includes a first disk unit 101 and a second disk unit 102, controlled by the control circuit 30. The control circuit 30 includes an SOC 311 which controls the disk unit 101 and an SOC 312 which controls the disk unit 102. The SOC 311 includes an MPU 321 and the SOC 312 includes an MPU 322. In addition, the SOC 311 operates a VCM 1 by controlling an actuator driving amplifier 411 in an SVC 361 and the SOC 312 operates a VCM 2 by controlling an actuator driving amplifier 412 in an SVC 362. Thus, the magnetic disk device 100 is configured to separately operate the disk unit 101 and the disk unit 102.

In the disk unit 101, a microactuator driving amplifier 421 is provided in a head amplifier IC 201. The microactuator driving amplifier 421 drives microactuators MA11, MA21, . . . , MAN1 based on the instruction from the MPU 321. The disk unit 101 includes read heads R11, RN1 and write heads W11, W21, . . . , WN1. Although FIG. 7 shows only the microactuator driving amplifier 421 in the head amplifier IC 201, the other components 50-55 shown in FIG. 4 or 6 may be included therein.

In the disk unit 102, a microactuator driving amplifier 422 is provided in a head amplifier IC 202. The microactuator driving amplifier 422 drives microactuators MA12, MA22, . . . , MAN2 based on the instruction from the MPU 322. The disk unit 102 includes read heads R12, RN2 and write heads W12, W22, . . . , WN2. Although FIG. 7 shows only the microactuator driving amplifier 422 in the head amplifier IC 202, the other components 50-55 shown in FIG. 4 or 6 may be included therein.

According to the magnetic disk device 100 described above, the microactuator driving amplifier 421 which drives the microactuators MA11, MA21, . . . , MAN1 is provided in the disk unit 101 and the microactuator driving amplifier 422 which drives the microactuators MA12, MAN2 is provided in the disk unit 102. Therefore, the size of the circuit of the SVCS 361 and 362 in the control circuit 30 can be made small. Therefore, the degree of design freedom of the circuit configuration in the control circuit 30 can be increased.

Similar to the second embodiment, the microactuator driving amplifiers 421 and 422 may be respectively provided in any locations in the disk units 101 and 102, not in the head amplifier ICs 201 and 202.

Further, the embodiment describes a configuration in which the two disk units 101 and 102 are provided in the magnetic disk device 1, but is not limited thereto. Three or more disk units may be provided. As described above, when three or more disk units are provided, the degree of design freedom of the circuit configuration in the control circuit 30 can be further enhanced.

Fourth Embodiment

The fourth embodiment is different from the first embodiment in that the number of microactuators to be operated is not one but a plurality of microactuators is operated according to operation modes. Only the difference will be described below. The same components as those of the first embodiment are denoted by the same reference signs and detailed descriptions thereof will be omitted.

In the fourth embodiment, the magnetic disk device 1 can operate in either a first operation mode or a second operation mode. The first operation mode is a mode where only one switch of the second switching circuit 55 is connected to operate one of the microactuators MA1, MA2, . . . , MAN as described above. The second operation mode is a mode where a plurality of switches of the second switching circuit 55 is connected to operate a plurality of microactuators. In this case, the term "plurality" refers to any number of two or more, for example, two, all, or a half thereof (for example, up and down in an axial direction of the actuator, or even and odd).

Figure 8:
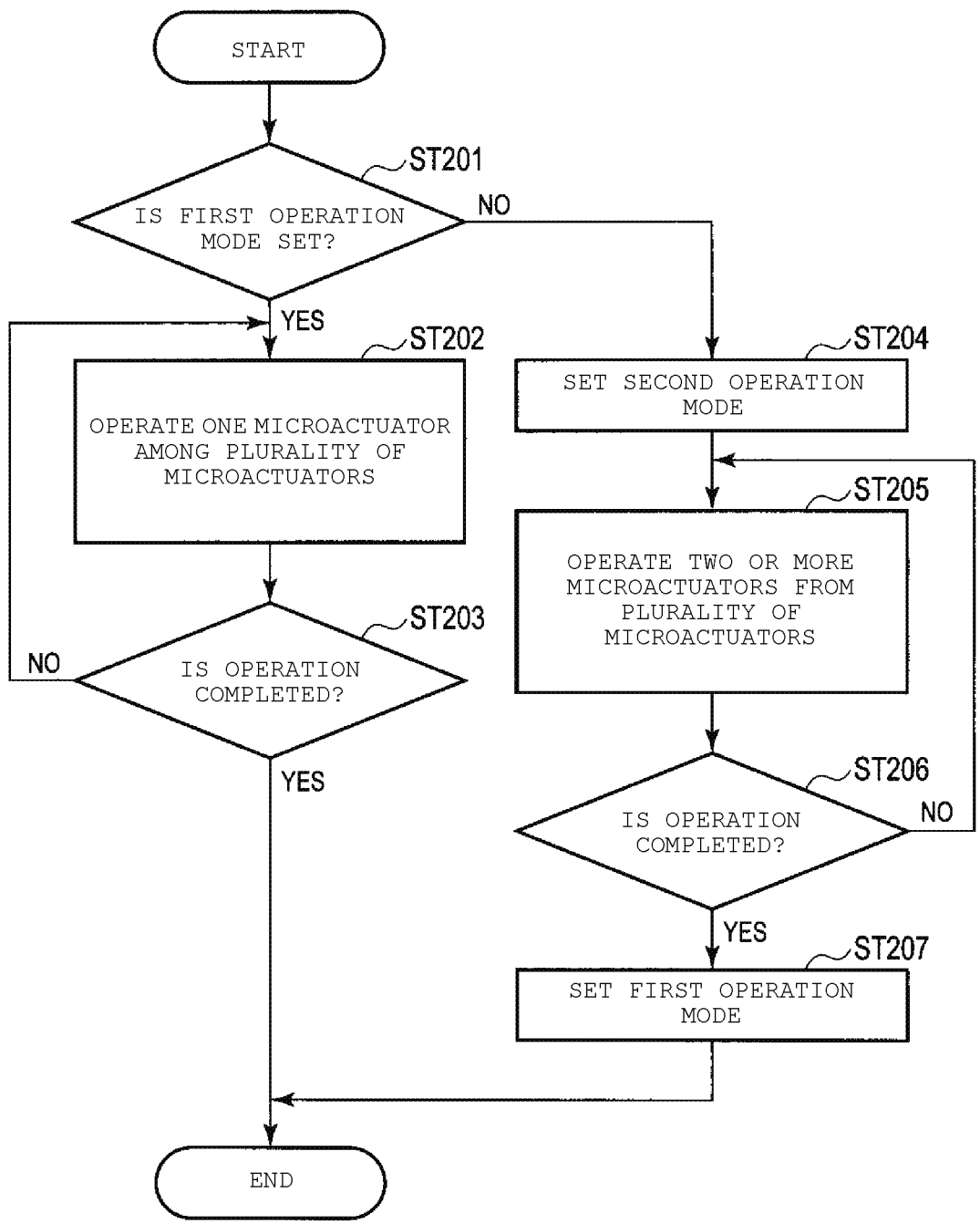
FIG. 8 is a flowchart illustrating a process of setting an operation mode according to a fourth embodiment.

Next, the process of setting the operation mode will be described. FIG. 8 is a flowchart illustrating a process for setting the operation mode in the fourth embodiment. The process is executed by the MPU 32 by executing a program stored as firmware in the flash ROM 35, for example.

As illustrated in FIG. 8, first, the MPU 32 determines whether or not the set operation mode is the first operation mode (ST201). For example, the determination is made based on whether a special operation mode, not a normal read/write operation, is specified. The special operation mode is set, for example, when the head disk assembly is being assembled. When it is determined that the first operation mode is set (ST201: YES), the MPU 32 operates one microactuator from the plurality of microactuators MA1, MA2, . . . , MAN as described above (ST202), and ends this process when it is determined that the operation is completed (ST203: YES).

On the other hand, when it is determined that the first operation mode is not set (ST201: NO), in other words, when it is determined that the special operation mode is specified, the MPU 32 sets the second operation mode (ST204). Next, the MPU 32 operates a plural number of microactuators from the plurality of microactuators MA1, MA2, . . . , MAN (ST205), and when it is determined that the operation is completed (ST206: YES), the operation mode is set to the first operation mode (ST207) and this process ends.

According to the magnetic disk device 1 described above, it is possible to operate not only one microactuator from the plurality of microactuators MA1, MA2, . . . , MAN, but also a plural number of microactuators according to a special operation. Therefore, it becomes possible to respond to various processes.

Further, the magnetic disk device 1 described in the above embodiments includes: a plurality of magnetic recording surfaces of a plurality of magnetic disks 11 (e.g., four magnetic recording surfaces in two magnetic disks) including a first magnetic recording surface; and a first magnetic head corresponding to the first magnetic recording surface, and further includes: a plurality of magnetic heads 16a which read or write data from or to the plurality of magnetic recording surfaces, an actuator 14 which drives the plurality of magnetic heads 16a when data is read or written by the first magnetic head from or to the first magnetic recording surface, and a plurality of microactuators MA1, MA2, . . . , MAN, each of which is separately driven when data is read or written by the first magnetic head from or to the first magnetic recording surface.

In this case, the plurality of magnetic recording surfaces and the plurality of magnetic heads 16a correspond one to one, and one operating microactuator can be the microactuator provided in the first magnetic head, that is, provided in the suspension 15 corresponding to the first magnetic head.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a first control circuit; and
    a disk unit connectable to the first control circuit via a connector and comprising
        a plurality of magnetic disks,
        a plurality of magnetic heads configured to read or write data from or to the magnetic disks,
        a first actuator configured to move the magnetic heads,
        a plurality of second actuators each configured to move the corresponding magnetic head, and
        a second control circuit that includes:
            a switch circuit configured to connect the first control circuit and one of the second actuators via the connector, and
            a measurement circuit configured to measure electrical characteristics of one of the second actuators upon receipt of a signal from the second actuator, wherein
    the first control circuit is configured to
        transmit to the disk unit via the connector an instruction in which one of the magnetic heads is specified,
        control one of the second actuators corresponding to the specified magnetic head to move the magnetic head, via the switch circuit, and
        based on electrical characteristics of the one of the second actuators measured by the measurement circuit, determine whether an error occurs in the one of the second actuators.

2. The magnetic disk device according to claim 1, wherein the disk unit further comprises a head selection circuit configured to control the switch circuit to connect the first control circuit to the one of the magnetic heads corresponding to the specified magnetic head.

3. The magnetic disk device according to claim 1, wherein the electrical characteristics include a resistance value of the one of the second actuators.

4. The magnetic disk device according to claim 1, wherein in a predetermined mode, the switch circuit connects the first control circuit to two or more of the second actuators.

5. The magnetic disk device according to claim 1, wherein the disk unit further comprises an actuator driving circuit configured to drive the second actuators.

6. The magnetic disk device according to claim 5, wherein the second control circuit is a head amplifier circuit, and the actuator driving circuit is arranged in the head amplifier circuit together with the switch circuit.

7. The magnetic disk device according to claim 1, wherein the first control circuit further comprises an actuator driving circuit configured to drive the second actuators.

8. The magnetic disk device according to claim 1, wherein the first actuator is configured to coarsely adjust a position of the magnetic heads with respect to the magnetic disk.

9. The magnetic disk device according to claim 1, wherein each of the second actuators is configured to finely adjust a position of the corresponding magnetic head with respect to the magnetic disk.

10. The magnetic disk according to claim 1, wherein the first control circuit further comprises:
    a first actuator driving circuit configured to drive the first actuator, and
    a second actuator driving circuit configured to drive the second actuators via the second control circuit.

11. The magnetic disk according to claim 1, wherein
    the first control circuit comprises a first actuator driving circuit configured to drive the first actuator, and
    the second control circuit further comprises a second actuator driving circuit configured to drive the second actuators via the switch circuit.

12. A magnetic disk device comprising:
    a first control circuit; and
    a plurality of disk units each connectable to the first control circuit via a connector and comprising
        a plurality of magnetic disks,
        a plurality of magnetic heads configured to read or write data from or to the magnetic disks,
        a first actuator configured to move the magnetic heads,
        a plurality of second actuators each configured to further move one of the magnetic heads, and
        a second control circuit that includes:
            a switch circuit configured to connect the first control circuit and at least one of the second actuators via the connector, and
            a measurement circuit configured to measure electrical characteristics of one of the second actuators upon receipt of a signal from the second actuator, wherein
    the first control circuit is configured to
        transmit to one of the disk units via the connector an instruction in which one of the magnetic heads is specified,
        control one of the second actuators corresponding to the specified magnetic head to move the magnetic head, via the switch circuit, and
        based on electrical characteristics of the one of the second actuators measured by the measurement circuit, determine whether an error occurs in the one of the second actuators.

13. The magnetic disk device according to claim 12, wherein
    each of the disk units further comprises a head selection circuit configured to control the switch circuit to connect the first control circuit to the one of the magnetic heads corresponding to the specified magnetic head.

14. The magnetic disk device according to claim 12, wherein
the electrical characteristics include a resistance value of the one of the second actuators.

15. The magnetic disk device according to claim 12, wherein
in a predetermined mode, the switch circuit connects the first control circuit to two or more of the second actuators.

16. The magnetic disk device according to claim 12, wherein
each of the disk units further comprises an actuator driving circuit configured to drive the second actuators.

17. The magnetic disk device according to claim 16, wherein
the second control circuit is a head amplifier circuit, and
the actuator driving circuit is arranged in the head amplifier circuit together with the switch circuit.

18. The magnetic disk device according to claim 12, wherein
the first control circuit further comprises an actuator driving circuit configured to drive the second actuators.

19. The magnetic disk device according to claim 12, wherein
the first actuator is configured to coarsely adjust a position of the magnetic heads with respect to the magnetic disk.

20. The magnetic disk device according to claim 12, wherein
each of the second actuators is configured to finely adjust a position of the corresponding magnetic head with respect to the magnetic disk.

* * * * *